T. B. DE FOREST,

Assignor to R. N. BASSETT.

Corset and Dress Stay.

No. 9,643. Reissued April 5, 1881.

WITNESSES:

Salvi LaGrassa

S. H. Colley

INVENTOR:

Thomas B. De Forest

BY J. B. Staples his ATTORNEY.

UNITED STATES PATENT OFFICE.

THOMAS B. DE FOREST, OF BIRMINGHAM, CONNECTICUT, ASSIGNOR TO ROBERT N. BASSETT, OF SAME PLACE.

CORSET AND DRESS STAY.

SPECIFICATION forming part of Reissued Letters Patent No. 9,643, dated April 5, 1881.

Original No. 82,209, dated September 15, 1868. Application for reissue filed February 15, 1881.

*To all whom it may concern:*

Be it known that I, THOMAS B. DE FOREST, of Birmingham, in the county of New Haven and State of Connecticut, have invented new and useful Improvements in Dress and Corset Stays; and I do hereby declare that the following is a full and exact description thereof, reference being had to the drawings accompanying and making part of this my specification.

Figure 1:
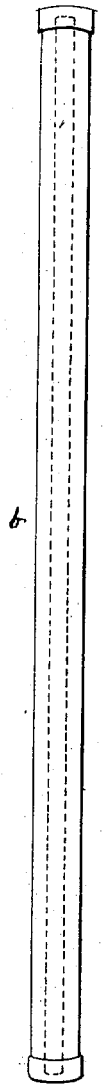
Figure 2:
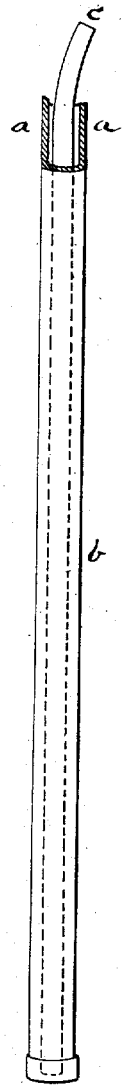
Figure 3:
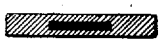

Figure 1 of drawings represents a front view of a corset-stay; Fig. 2, a front view of the corset-stay with a portion of the covering broken away to show the stay; Fig. 3, a transverse section of a corset-stay enlarged.

This invention relates to an improvement in corset-springs, which are usually termed "stays," which are also used as stays for ladies' dresses, and is intended as a substitute both for the simple steels and bones now in general use.

Heretofore springs or stays for corsets and for ladies' dresses have been made of thin steel cut to the proper size, or of bones or rattan, which are extremely liable to break or become set, and thus become useless for the purpose intended.

The objects of this invention are to reduce the expense of corset steels or stays, and to produce a stay which will be less likely to break or become set from being retained in any fixed form or position than has heretofore been the case.

It consists in forming the stay of narrow steel by adding to the steel and combining therewith a body of paper or similar fibrous material along the entire length of the stays surrounding and enveloping the steel, and so incasing the same or having the wire inserted within the paper as to give to the stay the required strength and elastic force which it would not have if constructed with the narrow flat piece of steel alone.

In order to the clear understanding of my invention, I will fully describe the same and the manner of constructing corset-stays in conformity therewith.

I first prepare strips of paper, *a a*, or of similar fibrous material, of the width required for the stays, and I then place the thin flat piece of steel *c* between the strips of paper longitudinally its entire length, a section of which is shown enlarged in Fig. 3; or, instead of this, the thin strip of steel may be placed between two strips of paper along its edges for its entire length. In either case the whole of the parts—that is to say, the steel strip and the strips of paper—are then to be covered with a strip of paper, *b*, or similar material, so as to inclose and make a complete whole with the parts just described. The folding of the paper over the steel and the strips and the laying of the inner strips of paper along the steel, as described, may be done by suitable machinery or by hand. Preferably I use hard-calendered paper. The paper and steel strip are united and made to adhere in a solid mass or body together by means of cement or any suitable adhesive substance.

By this construction of the stay a large amount of steel commonly used for stays may be dispensed with, the fibrous material so placed and embodied in one mass or body upon and with the steel creating a stay of the proper size, and the uniting of the paper and metallic spring together, as described, prevents the setting of the stay in the curved form which it assumes when worn upon the body.

I make the stays of the various lengths which may be required for different parts of the corsets or dress-waists.

The paper body is less liable to wear or injure the garment than the bones or rattan commonly used, and the cost, when the durability is considered, is less for my improvement than the ordinary stays.

The stay thus constructed may be braided if desired, or covered with a textile covering; but the expense of japanning is entirely avoided, and the braiding or textile covering may be dispensed with or not.

The stays thus formed may be tipped or not, this tipping not being essential in many cases.

Having thus fully described my invention, what I claim as new and useful, and desire to secure by Letters Patent, is—

As a new article of manufacture, a corset or dress stay composed of a narrow steel strip and strips of paper combined and united together in one mass or body by cement or any suitable adhesive substance longitudinally with the steel strip, and inclosing the said steel, substantially as set forth.

THOMAS B. DE FOREST.

Witnesses:

CHAS. E. CLARK,

W. S. BROWNE.